US005145692A

United States Patent [19]

Hereford

[11] Patent Number: 5,145,692

[45] Date of Patent: Sep. 8, 1992

[54] BRICK MAKING APPARATUS

[76] Inventor: Judson A. Hereford, Rt. 2, Box 3144, Nacogdoches, Tex. 75961

[21] Appl. No.: 636,726

[22] Filed: Jan. 2, 1991

[51] Int. Cl.[5] .................................... B29C 43/00

[52] U.S. Cl. .................................... 425/139; 425/148; 425/150; 425/257; 425/259; 425/261; 425/348 R; 425/361; 425/444

[58] Field of Search .................... 425/60, 62, 139, 148, 425/150, 165, 166, 167, 253, 256, 257, 259, 261, 345, 348 R, 353, 361, 409, 444, 449, 453

[56] References Cited

U.S. PATENT DOCUMENTS

| | | | |
|---|---|---|---|
| 266,532 | 10/1882 | Ross | 425/361 |
| 686,656 | 11/1901 | Hoban | 425/261 |
| 1,335,071 | 3/1920 | Moussette | 425/345 |
| 1,599,151 | 9/1926 | Vought | 425/361 |
| 1,792,844 | 2/1931 | Knecht | 425/361 |
| 2,560,208 | 7/1951 | Benischek | 425/444 |
| 4,035,128 | 7/1977 | Drostholm et al. | 425/345 |
| 4,362,494 | 12/1982 | Schreiner et al. | 425/345 |
| 4,498,857 | 2/1985 | Kinnamon | 425/361 |
| 4,557,681 | 12/1985 | Wright et al. | 425/350 |
| 4,640,671 | 2/1987 | Wright | 425/361 |
| 4,705,470 | 11/1987 | Penta | 425/261 |
| 4,725,216 | 2/1988 | Foster | 425/361 |

*Primary Examiner*—Jay H. Woo
*Assistant Examiner*—Scott Bushey
*Attorney, Agent, or Firm*—Marvin J. Marnock

[57] ABSTRACT

Portable brick manufacturing apparatus (20) mounted on a skid pad (21) includes two brick making systems. Each system includes a ring (25, 65) with three open-ended mold boxes (23, 70) mounted to the ring in equiangular spacing thereabout. Drive means (30,32,30′,31′) and an indexing controls mechanism (51) operate to rotate the ring in steps such that the mold boxes come to rest at a fill station, a compacting station and a brick ejection station, respectively. The two systems share a compacting station and a slide plate (60) provides a bottom for the mold boxes at the fill and compacting stations and in movement therebetween for each systems. In one system, hoppers (52,56) conveyors (54,49) a blender (58) and a spray nozzle (59) deliver soil and additives to a mold box at the fill station. Similar components are included in the second system. The indexing mechanism (51) responds to a sensor signal to control the weight of depost in a mold box. It also controls a ram (35) at the compacting station for compacting soil and additives to form a brick and a ram (50) for ejecting a brick from a mold box at the ejection station. The two systems can operate separately or in synchronism such that a mold box (23) from the first system and a mold box (70) from the second system are received in alternation at the compacting station, provided both systems use the same ram press plate.

5 Claims, 6 Drawing Sheets

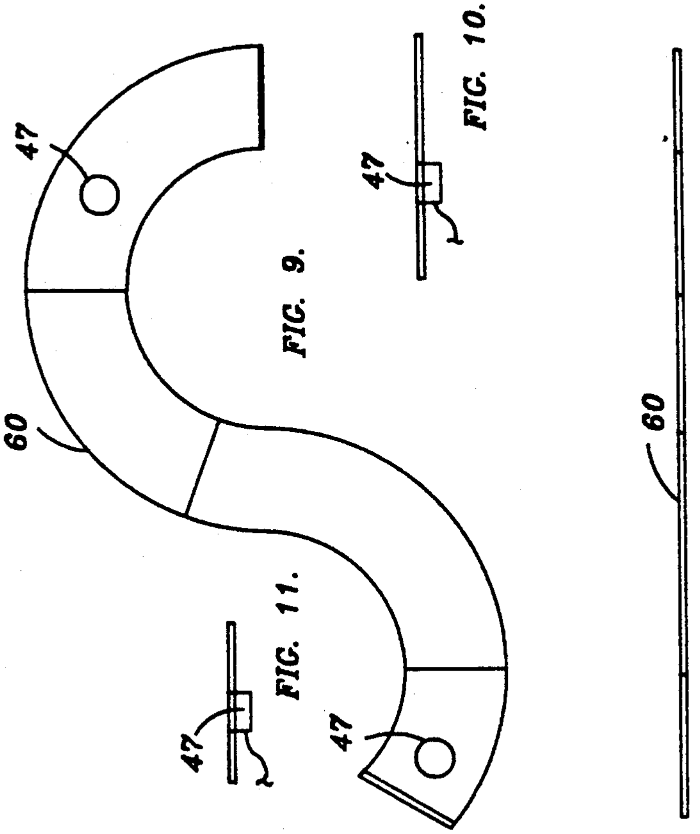
FIG. 9.
FIG. 10.
FIG. 11.
FIG. 12.
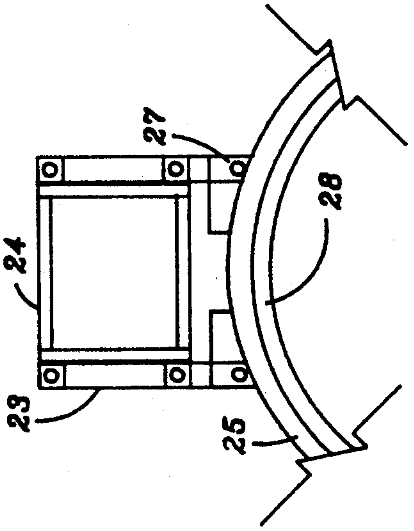
FIG. 8.

BRICK MAKING APPARATUS

FIELD OF THE INVENTION

This invention relates to portable pressed earth brick manufacturing equipment, and more particularly to portable brick making apparatus comprising two brick making systems, each of which is suitable for making bricks at the intended construction site from common soil and for the in-line addition of chemical additives for enhancing the quality of the bricks, and wherein the two systems are so related as to allow mold changes to be made on one system while the other system is in operation.

BACKGROUND ART

Various forms of portable brick making apparatus have been devised for achieving the high volume production of pressed earth bricks near a proposed building site. These generally employ "earth" material which is provided at the site and is hydraulically compressed into a mold to form a brick. The apparatuses are designed to produce a brick of one size and are not easily convertible to the manufacture of different sized bricks, such as wall or truss bricks or specialty bricks which could be used as floor tiles or roof tiles for the structures to be built therefrom or for decorative purposes, without stopping the machine to change the molds. U.S. Pat. Nos. 3,225,409 and 4,557,681 disclose adobe brick making apparatus for making a given sized brick but which is difficult to adapt to manufacture bricks of a different size without a major and time consuming changing of their mold components which must be done with the machines production stopped long enough to make the changes.

SUMMARY OF THE INVENTION

The invention is a portable brick manufacturing apparatus mounted on the floor of a skid pad, or the like, which is readily transportable to an intended building site for the "on-site" manufacture of bricks. The apparatus includes two brick making systems, the first of which includes a ring member mounted on the skid pad and drive means, also located on the pad, for rotating the ring about its central axis. Three open-ended mold box holding assemblies are mounted to the ring in equiangular 120° spacing thereabout. The ring is controlled by an indexing controls mechanism to move in intermittent steps of arcuate movement such that the mold boxes come to rest at stations which are located in equiangular 120° spacing about the rotary axis of the ring and respectively defined as a fill station, a compacting station and a brick ejection station. A slide plate is mounted on the skid pad in abutting engagement with the underside of mold boxes located at the fill and compacting stations and provides a bottom for the mold boxes at the fill and compacting stations and when in movement therebetween.

A first hopper and conveyor are provided for delivering soil to a blender device mounted directly above the fill station. A spray nozzle and a second hopper and conveyor are provided for delivering chemical additives to the blender at a predetermined rate such that the soil and additives are delivered to a mold box at the fill station in a desired proportion, along with the proper liquid additives content if needed. A weight sensor mounted in the slide plate at the fill station signals when a predetermined weight of soil or soil and additives are deposited in the mold box and the indexing controls mechanism responds to the signal to halt further deposit in the mold box, and at the same time index the filled mold to the compacting station. The indexing mechanism also controls a high pressure ram at the compacting station which is operable for compacting the soil or soil and additives in a mold box to form a brick and a low pressure ram at the ejection station, which is operable for ejecting a brick from a mold box at the ejection station.

A second brick making system for the manufacture of special sized bricks is also mounted on the skid pad and aside from a different configuration of molds, is otherwise identical to the first brick making system. The two systems, which share a common compacting station and the high pressure ram, are separately operable but can be operated in synchronism by intermittent rotation of their ring members in 60° steps of arcuate movement such that a mold box from the first brick making system and a mold box from the second brick making system are received in alternation at the compacting station, provided the press plate is the same for both sets of molds being run.

BRIEF DESCRIPTION OF THE DRAWINGS

FIG. 8 is a fragmentary view showing details of a mold box assembly included in the apparatus of FIG. 1;

FIG. 9 is a top plan view of a slide plate with weight scales, which is included in the apparatus of FIG. 1;

FIG. 10 is a side view of an end component of the slide plate of FIG. 9, which component is part of one of the brick making systems included in the invention and includes a weight scale mounted therein;

FIG. 11 is a side view of another end component of the slide plate of FIG. 9, which component is part of another brick making system of the invention and includes a weight scale mounted therein;

FIG. 12 is a side edge view of the slide plate shown in FIGS. 10 and 11, with weight scales removed therefrom;

DESCRIPTION OF THE PRESENT INVENTION

Figure 1:
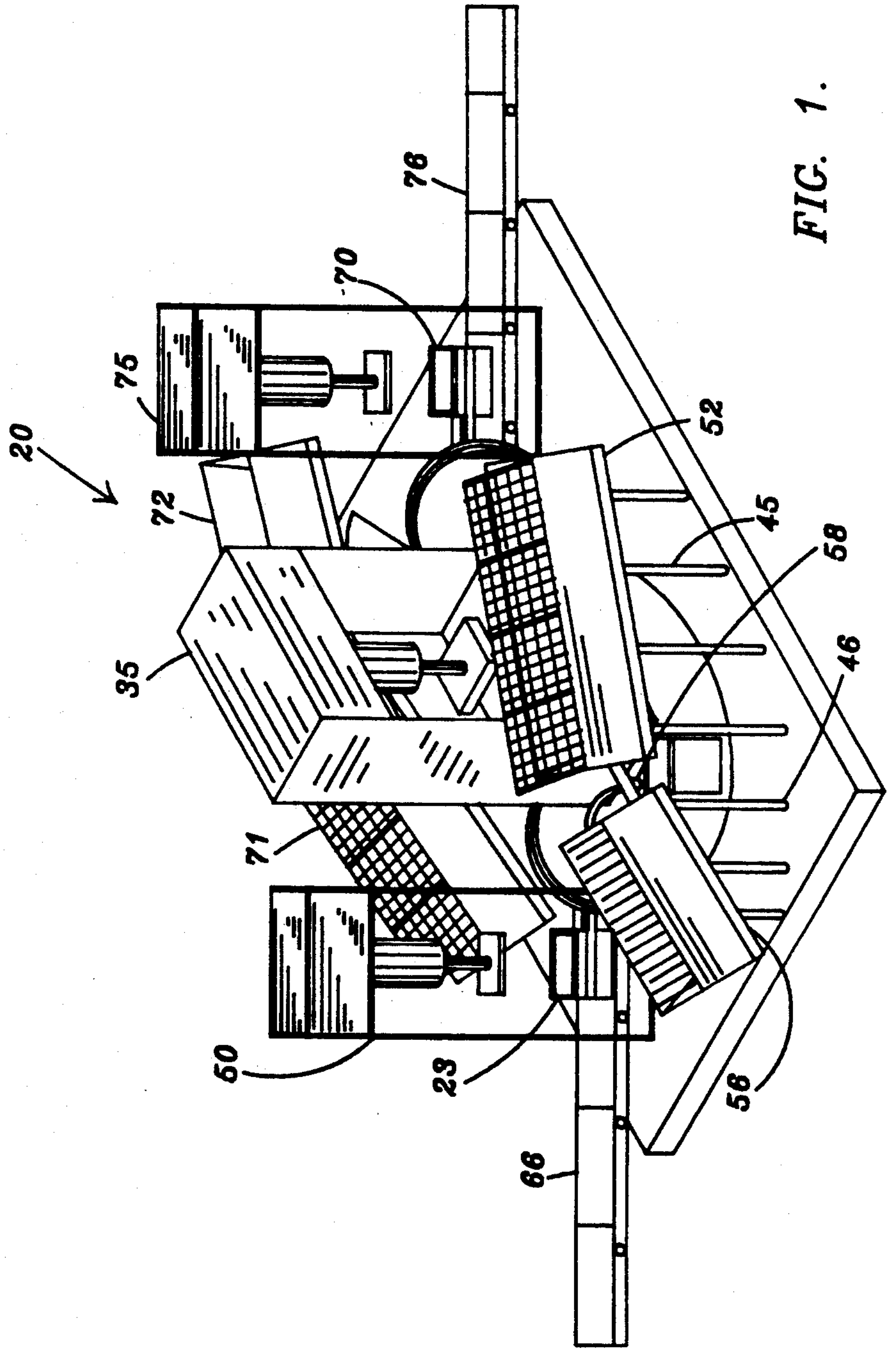
FIG. 1 is a perspective view of portable brick making apparatus in accordance with the invention, parts of which are removed for clarity.
Figure 2:
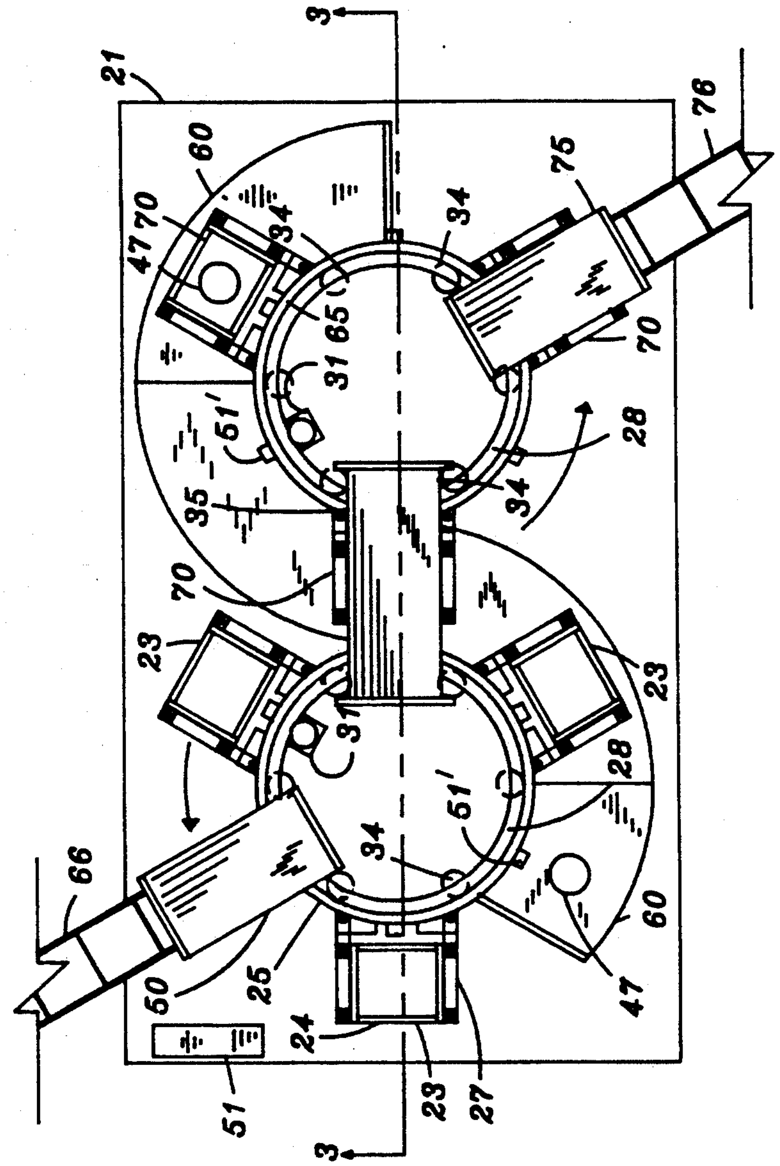
FIG. 2 is a top plan view of the apparatus of FIG. 1 from which a soil delivery conveyor system and a chemical additives delivering system have been removed for clarity.

There is shown in FIG. 1, a brick making apparatus 20 which is mounted on a skid pad 21. The skid pad 21 could be the bed of a truck or truck trailer but if separate therefrom, can be placed and mounted on a truck bed for transportation to a building site for the "on-site" manufacture of bricks. The apparatus 20 includes two brick making systems for making bricks of two different sizes and configurations. A first brick making system of the apparatus 20 designed to make building bricks suitable for wall construction and the like, includes three rectangular mold box assemblies 23 as shown in FIG. 2 which are mounted on the exterior of a rotary ring member 25 in equiangular 120° spacing thereabout with each mold box aligned in a radial direction of the ring member 25. Each mold box assembly 23 includes an open steel frame 24, rectangular in shape, which is bolted to a pair of steel mounting arms 27 affixed by bolting to the exterior curved surface of the ring member 25.

Figure 14:
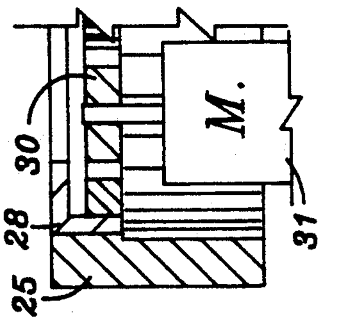
FIG. 14 is a fragmentary view, partly in section, showing the interconnection of a drive motor with the mold box carrying ring member which forms a part of one of the brick making systems of the invention.

As shown in FIG. 14, the ring member 25, which is of circular cylinder configuration, is provided with an angle iron ring 28 which is welded or bolted thereto about its inner peripheral surface. The vertical leg of the angle iron ring is provided with a drive gear ring 29 affixed to the inner periphery thereof by welding or the like, with teeth about its inner circumference which cooperatively engage with a motor pinion gear 30. One such gear 30 is shown affixed to the rotary drive shaft of a motor 31 which is mounted on the skid pad 21. It is to be understood, however, that the number of such pinion gears and motors may be more than one, as may be required.

Figure 15:
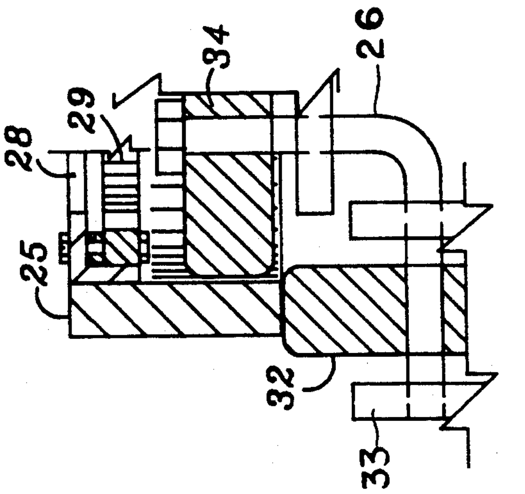
FIG. 15 is a fragmentary view, partly in section, which shows a support roller and guide roller for the rotary ring member of FIG. 14.

As shown in FIG. 15, the ring member 25 is supported on a plurality of support rollers 32 which are mounted on leg supports 33 on the skid pad 21 and are disposed in rolling engagement with the underside of the ring 25. In addition, the ring 25 is engaged by a plurality of guide rollers 34, also mounted on the leg supports 33, with their roller surfaces engaged with the interior of the ring 25 along its inner peripheral side surface as best seen in FIG. 15. One such guide roller 34 and support roller 32 are journalled in different right angle portions of an axle member 26 mounted and braced on each leg support 33, which is of equal length with the other leg supports 33, such that the ring member 25 is supported in a plane which is substantially parallel to the surface of the skid pad 21.

Figure 13:
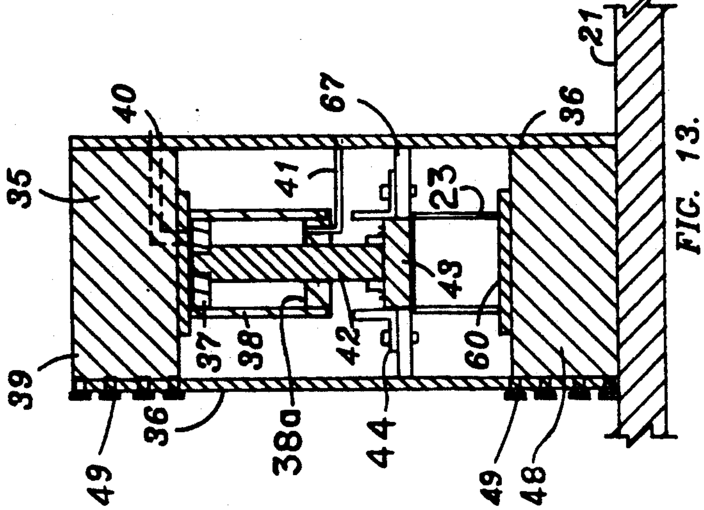
FIG. 13 is a view of a hydraulic ram which is part of the invention as taken along the section line 3—3 in FIG. 2.

Also mounted on the skid pad 21 is a high pressure hydraulic ram 35 mounted on vertical side walls 36 which are anchored to the skid pad. As best seen in FIG. 13, the ram 35 includes a piston 37 mounted within a cylinder 38 which is suspended vertically from a cross beam 39 which joins the upper ends of the vertical side walls 36. One of the vertical walls 36 is mounted to the cross beam 39 and a lower cross beam 48 by bolts 49 so as to be readily removable from the cross beams 39 and 48 to allow installation of the ring member 25 within the ram supporting frame provided by the cross beam 39 and the vertical walls 36. The piston 37 is downwardly extensible or upwardly retractable in response to the selected application of hydraulic pressure above or below the piston 37 within the cylinder 38 through cylinder ports 40,41 at opposite ends of the cylinder 38 and which are connected in fluid communication with a source of hydraulic fluid pressure (not shown). A piston shaft 42 affixed to the piston 37 extends through the lower end 38a of the 38 in fluid-tight sealed relation therewith and is fitted at its lower end with a steel press plate 43 sized and configured to fit loosely within the rectangular frame 24 of a mold box assembly 23. A press plate guide means 44 in the form of angle iron members with anti-friction surfaces are mounted on braces 67 and are adjustable against the long sides of the press plate to hold it in alignment until the press plate enters the mold box 23 during a downward stroke of the piston 37. The guides 44 are adjustable towards or away from the side walls 36 for placement against the press plate. The ram 35 is designed to exert hydraulic force as much as 250,000 lbs. total force, thereby converting any soil or other mixture in the mold box into a brick.

Figure 3:
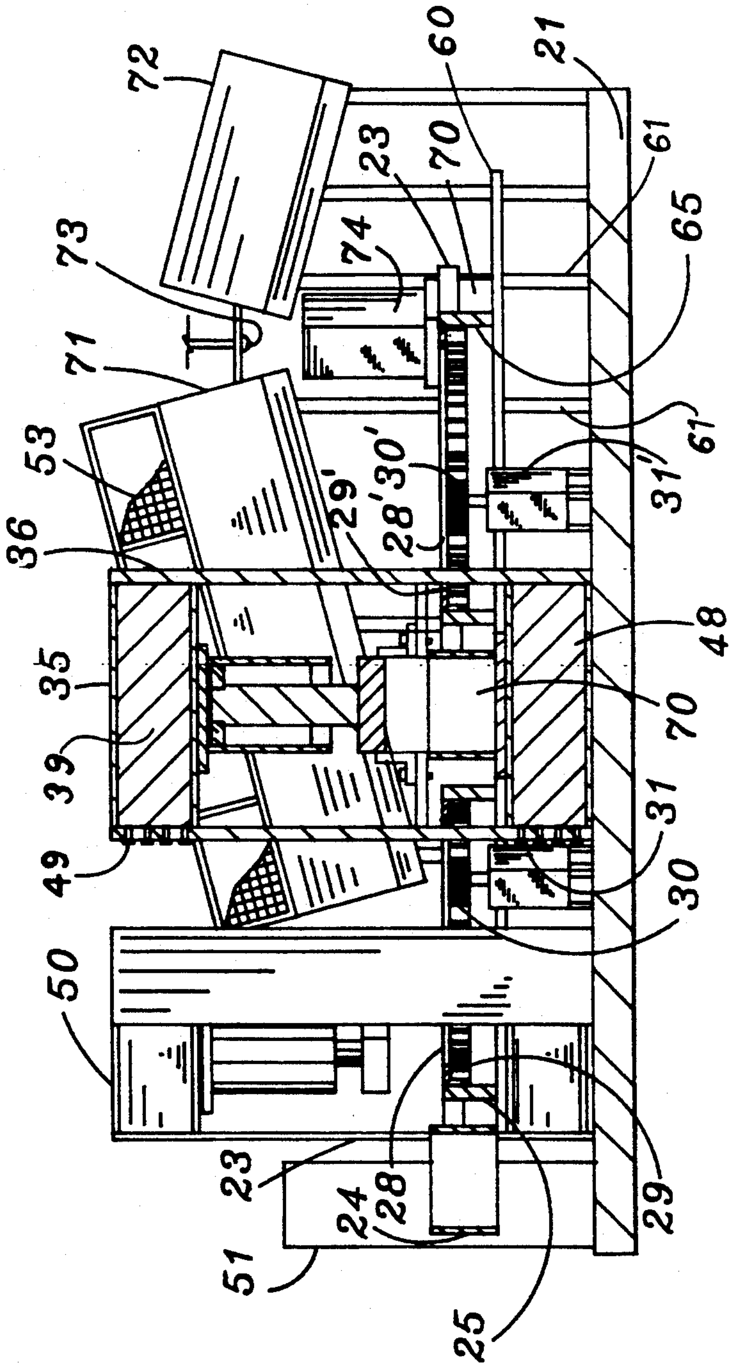
FIG. 3 is a section view as taken along the section line 3—3 in FIG. 2.

Also mounted on the skid pad 21, as shown in FIG. 3, is a low pressure hydraulic ram 50 which is substantially identical to the ram 35 but sized to provide a much smaller ram force in the range of approximately 5,000 lbs. total force. The low pressure ram 50 is positioned adjacent the ring member 25 at a location displaced from the ram 35 by an angle of 120° with relation to the rotation axis of the ring member 25. The ram assemblies 35 and 50 are both supplied with hydraulic pressure from the same source of hydraulic pressure.

The ring member 25 is adapted to be driven in rotary motion about its central axis by the drive motor 31 through interaction of the pinion drive gears 30 with the gear 29 affixed to the ring 28. However, the rotation of the ring 25 is made to occur in intermittent steps of 120° displacement by an appropriate indexing controls mechanism 51 located on the skid pad 21 and including at least one latching mechanism 51' of conventional type which is cooperably connected thereto, such as a spring biased latch pin which is adapted to engage a latching surface provided on the ring member 25 at equiangularly spaced locations thereon, and is hydraulically retractable therefrom by operation of the indexing controls mechanism with the latching mechanisms signaling a release such that each mold box 23 is stopped successively at three different stations during one complete revolution of the ring member 25. The high pressure ram 35 is positioned directly above one of the stations designated as the compacting station and the low pressure ram 50 is located directly above another station which is designated the ejection station. A first station, designated the fill station, is located by 120° angular displacement from the ejection station and similar angular displacement from the high pressure ram 35 compacting station. By rotation of the ring member 25, each mold box 23 is successively moved in steps from the fill station to the compacting station and then to the ejection station.

Figure 5:
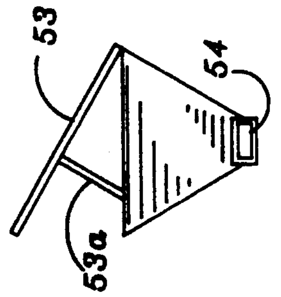
FIG. 5 is an end view of the soil receiving hopper shown in FIG. 4.

The soil or soil mixture for compacting into bricks is delivered to the fill station by an elevated inclined soil receiving hopper 52 which extends from one side of the skid pad 21 to the fill station adjacent the rotary ring 25. The hopper 52, supported by legs 45, is provided with a separator screen, known as a "grizzly" screen 53, which receives the soil dumped into the hopper and separates out large particles and rocks. The screen is adapted to be vibrated by an appropriate "vibrator" (not shown) or the loader mechanism itself which dumps the soil onto the screen. The screen 53 is of equal length with the hopper 52 and pivotally mounted thereto along one side of the hopper. As shown in FIG. 5 the screen 53 is supported at an angle from the horizontal by a brace 53a so that particles which do not pass through the screen will roll off the screen.

Figure 6:
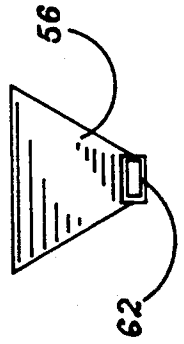
FIG. 6 is an end view of the claimed additives hopper shown in FIG. 4.

The bottom of the hopper 52 is defined by an endless conveyor belt 54 whereby dirt placed within the hopper and passed through the "grizzly" screen 53 is conveyed upwardly by the belt to be dumped into a mixer funnel 55 which is open at both ends and placed at the fill station just below and adjacent to the upper end of the hopper 52. A dry powder or chemical additives hopper 56, which also includes an endless conveyor belt 62 at the bottom thereof, as shown in FIG. 6, is also mounted on the skid pad 21 by support legs 46 in a position where the powder and/or chemical additives, such as cement and lime, can be readily deposited into the hopper and conveyed to one end where the powder and additives are dumped into the mixer funnel 55. The mixer funnel 55, suspended from end portions of hoppers 52,56, includes a rotary mixer 58 which can be operated by a variable speed hydraulic rotary motor at approximately 300 r.p.m. to intermingle the soil and additives in a desired proportion as they fall into a mold box 23 when the mold box 23 is located at the fill station.

A liquid additive or water spray nozzle 59 connected to a water supply or liquid additive supply (not shown) is also mounted just above the mixer funnel to deliver a predetermined amount of moisture and/or liquid additives to the soil when required. The conveyor belts of both hoppers 52,56 are controlled by the indexing controls mechanism 51 to stop in synchronism with the intermittent positioning of the mold boxes 23 to preclude dumping of soil and additives into the mixer funnel during the periods when the mold boxes are in transit between stations. The liquid spray nozzle 59 might also be controlled in synchronism with the conveyor belts 54,49 by the indexing controls mechanism to deliver water or other liquids only when soil and dry additives are being dumped into the mixer funnel. The spray nozzle 59 is connected by appropriate plumbing and conduits to a water supply or liquid additive supply in a reservoir or tank (not shown) which can be mounted on the skid pad 21 or placed adjacent thereto as on a tank truck.

Figure 4:
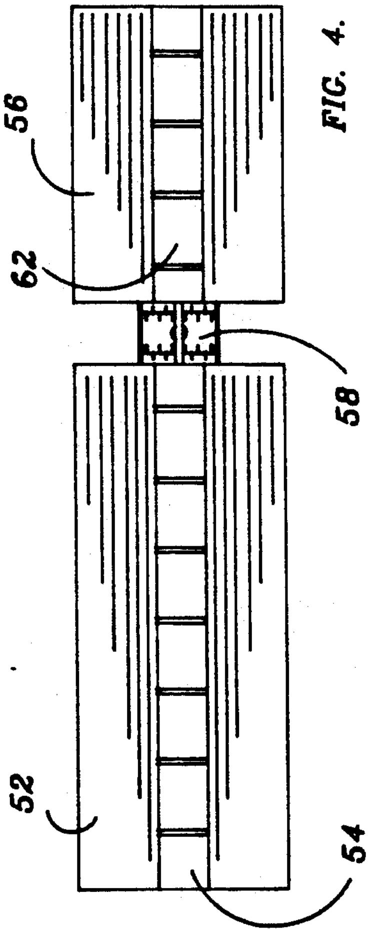
FIG. 4 is a top plan view of a soil receiving hopper and an additives hopper which are used in one of the brick making systems in the apparatus of FIG. 1, but showing the hoppers disposed horizontally to more clearly show details of instruction.
Figure 7:
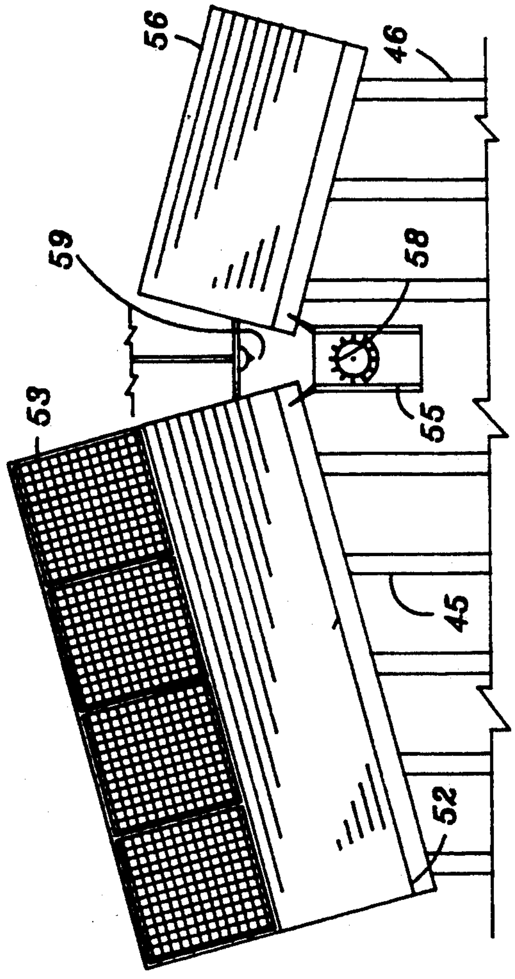
FIG. 7 is a front view of the soil receiving and additives hoppers of FIG. 4, but showing the hoppers as they are mounted at angles of inclination to the horizontal.

Also mounted on the skid pad 21 is a steel slide plate 60 which is supported by leg members 61 and cross beam 48 of ram 35 in a plane parallel to the skid pad 21 and the plane of ring member 25. The distance of the slide plate 60 above the skid pad is such that the bottoms of the rectangular frames 24 of a mold box 23 which is located at the fill station is in abutting engagement with the upper surface of the slide plate and is adapted to slide therealong as the mold box moves from the fill station to the compacting station. As shown in FIGS. 2 and 9 through 12 the slide plate 60 includes a first portion of arcuate configuration with a center of curvature corresponding to the center of ring member 25 and extending from the fill station to the compacting station. This first portion of the slide plate 60 is a component of the first brick making system of the apparatus 20. A weight scale 47 is mounted in the slide plate at the fill station. When a predetermined weight of soil and additives in the mold box 23 is sensed by the scale 47 and the surface level of the scale is co-planar with the surface of slide plate 60, the indexing controls mechanism 51 responds to an electrical signal from the scale 47 by controlling the conveyor electric drive motors (not shown) for halting the conveyor belts 54,62 (FIG. 4) and initiating a partial rotation of the ring 25 which moves the filled mold boxes 23 from the fill station to the compacting station.

A second portion of the slide plate 60 is of semicircular configuration with a center of curvature coincident with the center of a second ring member 65, shown in FIG. 2, which is substantially identical with the ring member 25 and is mounted on the skid pad 21 in co-planar relationship therewith. The ring member 65 and the semicircular portion of the slide plate 60 are components of a second brick making system of the apparatus 20, which second brick making system will hereinafter be later described.

In operation, the conveyor motors and rotary motors 31 are controlled by the indexing mechanism 51. With the conveyors in operation, soil for compacting into bricks is dumped by a front-end loader or other suitable dumping means into the hopper 52 where it is screened by the "grizzly" screen 53 to separate out "rocks" and other objects which exceed a predetermined size. The soil which passes through the screen is delivered to the mixer funnel 55 where it is mixed with appropriate additives which are simultaneously delivered thereto by the conveyor in hopper 56. The mixed soil and additives pass through the funnel 55 and fall into the mold box at the fill station to provide a quantity of given weight which is retained therein by the slide plate 60. Following a signal from the weight scale, the latches 51' are released and the indexing controls mechanism 51 after a preselected time interval or upon a release signal from the latches energizes the motors 31 to drive the ring 25 through an arcuate movement of 120° whereby the filled mold box 23 is moved along the slide plate 60 to the compacting station and the latches reengaged. A second mold box 23 at the fill station is filled with soil and additives from the mixer funnel until the filling is halted on a signal from the weight scale. The high pressure ram is then energized by the indexing mechanism to compress the soil in the mold box by the application of a compressing force of 250,000 lbs. and thereby form a building brick which is retained therein.

The indexing mechanism 51 then operates in a sequential step to rotate the ring member 25 and the mold boxes 23 in a counterclockwise direction to the next station where the brick-carrying mold box is moved to the ejection station and the soil carrying box is moved to the compacting station. Under control of the indexing mechanism 51, the rams 35 and 50 then operate simultaneously to eject the brick from the mold box at the ejection station and manufacture a brick at the compacting station, at the same time the third mold box is being filled with soil and additives at the fill station. As the sequence continues, it is possible to manufacture several hundred bricks an hour.

The bricks ejected from the mold box at the ejection station fall onto an endless conveyor belt 66 which is positioned on support members (not shown) with one end portion thereof directly below the ejection station. The manufactured bricks are conveyed by the conveyor belt 66 to a location where they may be removed and used or stacked for later use.

The second brick making system of the apparatus 20 is designed for the manufacture of special shape bricks as may be used as floor tiles, roof tiles or for decorative purposes. The second system which includes the ring member 65 with attached angle iron ring 28' is provided with three mold boxes 70 which are affixed thereto in the same way mold boxes 23 are affixed to the ring member 25 in the first brick making system. Aside from the mold boxes 70 which may be designed of different size and shape than the mold boxes 23 for the manufacture of special shaped bricks, the components of the system are substantially identical to those of the first brick making system. The ring member 65 is driven in counterclockwise direction by additional drive gears 29',30' and drive motor 31' which may be identical to those of the first brick making system. As best seen in FIG. 3, the system includes a soil receiving hopper 71, an additives hopper 72, a spray nozzle 73 and mixer funnel 74 which are identical to the corresponding members 52, 56, 59, 55 respectively of the first system. A low pressure ram 75 identical to the ram 50 is located at an ejection station which is equiangularly spaced from a second system fill station and the compacting station located at the ram 35. As shown in FIG. 2, the mold boxes 70 are located in exact position at the fill station, the compacting station and the ejection station.

The specialty brick making system is not normally operated when the first brick making system is operating. Its operation, however, is identical to that of the first system. Soil and dry additives are delivered by the hoppers 71,72 to a mold box 70 located at the fill station and is then carried in the mold box 70 on the semicircular portion of the slide member 60 to the compacting station where the mix is compressed by the high pressure ram 35 to form a brick. Each mold box 70 is moved in sequential steps by the indexing mechanism 51 to the fill station, the compacting station at the high pressure ram 35, and the brick ejection station at the low pressure ram 75. A conveyor 76, identical to the conveyor 66 of the first brick making system, is positioned to receive the bricks ejected by the low pressure ram 75 at the ejection station and carry them to a remote location where they are removed and used or stacked for later use.

It is desirable, particularly for operation of the brick making apparatus 20 in remote areas, that the indexing controls mechanism 51 includes a diesel or gasoline powered electrical generator for energizing the control mechanisms for the hydraulic motors 31 and the conveyor belts associated with a particular brick making system. It must also include controls for responding to the weight scales when a predetermined weight of soil in the mold box is sensed, and also for controlling the operation of the rams to initiate compaction and ejection when the mold boxes are on station.

It is also possible to simultaneously operate both brick making systems by adjusting the indexing controls mechanism 51 and associated latching mechanisms 51' such that the mold boxes of each system are moved in steps of 60° arcuate movement. The compacting station which is common to both systems then receives a mold box 23 and mold box 70 in alternation.

It will then be seen that the brick making apparatus disclosed herein is especially suitable for the manufacture of bricks at the construction site. The bricks may be made from freshly dug soil in proximity to the construction site with the addition of inexpensive additives for enhancing brick strength as well as waterproofing them. The bricks to be used as the primary building bricks for use in walls and other heavy load-bearing structures are generally made larger than standard baked bricks in sizes such as 4 inches thick by 7 inches by 14 inches or 4 inches thick by 10 inches by 14 inches. The bricks to be used as roof tiles, floor tiles, or for decorative purposes are generally made in thinner dimension and can easily be made in other than rectangular configuration by provision of specially configured mold boxes and their required press plates. It is important that the common soil selected for the manufacture of bricks have a suitable constituency and it has been found that a soil sample wherein the proportion of clay and silt is in the range of one-fifth to one-third of the sample volume will generally make the most suitable brick. The moisture content should also be in the range of 5 to 15% of sample volume.

This invention also enables unsatisfactory soils to be used by adding missing components with the additives hoppers 56. The additives are selected as may be required to improve the soil and the strength and quality of the bricks and their proportions are to be carefully measured for delivery from the additive hopper from which they are fed to the blender. The optimum weight of soil and additives to be delivered to a mold box for manufacture of a brick of given size can most easily be determined by manufacture of bricks in a test run.

An automated indexing and control mechanism is desired to reduce the required manpower and labor costs. It would be possible, however, to achieve manual operation of the apparatus by manually switching the drive motors on and off to move the mold boxes to their appropriate stations in sequential steps while at the same time controlling the latching mechanisms and the operation of the rams and soil hopper conveyors in synchronism therewith. Furthermore, if it becomes desirable to manufacture bricks of a different size, it is only necessary to unbolt the mold boxes from the rotary ring member of one system and replace these with mold boxes of a different size or insert a different mold in the mold box which can be done while the other system is in operation. A different configured press plate or pressure head must also be provided for the hydraulic rams.

It is to be understood therefore that the foregoing description of a preferred embodiment of the invention has been presented for purposes of illustration and explanation and is not intended to limit the invention to the precise form disclosed. For example, a friction drive might be used in lieu of a gear drive for rotation of the ring members 25 and 65. It is to be appreciated therefore, that various changes may be made by those skilled in the art without departing from the spirit of the invention.

I claim:

1. A portable brick manufacturing apparatus, said apparatus comprising a readily transportable support member providing a floor support surface;
   - a first brick making system comprising a ring member;
   - means for mounting said ring member on said floor support surface for rotation about a substantially vertical axis through the center of said ring member, said ring member having an external periphery and at least three mold boxes removably attached to said ring member at spaced intervals about the external periphery thereof, each said mold box including a bottomless frame member which is open at a top end and having side walls defining a mold enclosing area;
   - indexing control means for rotating said ring member about its central axis in intermittent steps wherein said mold boxes are sequentially moved in intermittent steps of arcuate movement along a circular path to a soil receiving fill station, a soil compacting station, and a brick ejection station, said stations being equiangularly spaced with respect to the axis of rotation of said ring member;

a slide plate mounted on said support surface in substantially parallel relation thereto and extending from said soil receiving station to said compacting station along the circular path traveled by said mold boxes, said slide plate being supported in abutting engagement with the frame members of the mold boxes when at the fill station and compacting station to provide a bottom for the mold boxes at said fill and compacting stations and when in movement therebetween;

a blender device positioned over said soil receiving fill station;

first conveyor means for delivering soil to said blender device;

second conveyor means for delivering chemical additives to said blender device at a predetermined rate, said blender device being operative to blend said soil and chemical additives and deliver the blended soil and chemical additives to a mold box located at said soil receiving station;

a weight sensor mounted in said slide plate at the soil receiving station for signaling when a predetermined weight of soil and additives are deposited in a mold box at the soil receiving station, said indexing control means being responsive to a signal from the weight sensor for controlling the weight of soil and additives which are deposited in the mold box at the soil receiving station;

a first ram means located at said compacting station for compacting the soil and additives in the mold box located at said compacting station to form a brick;

a second ram means located at said ejection station for ejecting a brick from a mold box located at said ejection station;

a second brick making system identical to said first brick making system wherein the ring member of said second system is mounted on said floor surface in substantially co-planar relationship with the ring member of said first brick making system; and wherein the slide plate of said second brick making system is a co-planar continuous extension of the slide plate of said first brick making system and the soil compacting station of said second brick making system is coincident with the soil compacting station of said first brick making system.

2. A portable brick manufacturing apparatus as set forth in claim 1 wherein said indexing mechanism includes means for controlling the intermittent steps of arcuate movement of each said ring member such that mold boxes of the first and second systems are positioned at the compacting station in alternation.

3. A portable brick manufacturing apparatus, said apparatus comprising a readily transportable support member providing a floor support surface;

a first brick making system comprising a ring member; means for mounting said ring member on said floor support surface for rotation about a vertical central axis through the center of said ring member, said ring member having an external periphery and at least three mold boxes removably attached to said ring member at spaced intervals about the external periphery thereof, each said mold box including a bottomless frame member which is open at a top end and having side walls defining a mold enclosing area;

indexing control means for rotating said ring member about said central axis in intermittent steps wherein said mold boxes are sequentially moved in intermittent steps along an arcuate path to a soil receiving fill station, a soil compacting station, and a brick ejection station, said stations being equiangularly spaced with respect to axis of rotation of said ring member;

a first slide plate section mounted on said support surface and extending from said soil receiving station to said compacting station along the arcuate path traveled by said mold boxes, said slide plate being supported in abutting engagement with the frame members of the mold boxes when at the fill station and compacting station to provide a bottom for the mold boxes at said fill and compacting stations and when in movement therebetween;

a blender device positioned over said soil receiving fill station;

first conveyor means for delivering soil to said blender device;

second conveyor means for delivering chemical additives to said blender device at a predetermined rate, said blender device being operative to blend said soil and chemical additives and deliver the resulting mixture to a mold box located at said soil receiving station;

a weight sensor mounted in said first slide plate section at the soil receiving station for signaling when a predetermined weight of soil and additives are deposited in a mold box at the soil receiving station, said indexing control means being responsive to a signal from the weight sensor for controlling the weight of soil and additives which are deposited in the mold box at the soil receiving station;

a first ram means located at said compacting station for compacting the soil and additives in the mold box located at said compacting station to form a brick;

a second ram means located at said ejection station for ejecting a brick from a mold box located at said ejection station; and a second brick making system having a second ring member mounted on said floor support surface, said second ring member having an external periphery and at least three mold boxes removably attached to said second ring member at spaced intervals about the external periphery thereof, each of said mold boxes of said second system including a box frame member having side walls defining a mold enclosing area and being open at its top and bottom ends;

said indexing control means including means for rotating said second ring member about its central axis in intermittent steps of arcuate movement wherein said mold boxes of said second system are sequentially moved in intermittent steps of arcuate movement along a second arcuate path to a second system soil receiving fill station, a second system compacting station, and a second system brick ejection station, said second system stations being equiangularly spaced with respect to the axis of rotation of said second ring member and said second system compacting station being coincident with the soil compacting station of said first system;

a second slide plate section mounted on said support surface and extending from said second soil receiving station and said compacting station along said second arcuate path traveled by said second system mold boxes, said second slide plate section being supported in abutting engagement with said box frame members of the mold boxes of said second system to provide a bottom for the mold boxes at said second system soil receiving station and said compacting station and when moving between the second station and said compacting station;

means mounted on said floor support surface and controlled by said control means to convey and deposit soil and chemical additives in a predetermined proportion to a mold box at the second system soil receiving station;

a second weight sensor mounted in said second slide plate section at the second soil receiving station for signaling when a predetermined weight of soil and additives are deposited in the mold box at the second soil receiving station, said controls means being responsive to a signal from said second weight sensor for controlling said conveyor means to deliver a predetermined amount by weight of soil and additives to the mold box at the second receiving station, said first ram means being operable for compacting soil and additives in a mold box of said second system when located at said compacting station to thereby form a brick; and a second ejecting means located at said second ejection station which is operable for ejecting a brick from a mold box located at said second ejection station.

4. A brick manufacturing apparatus, said apparatus comprising a support surface;

a brick making system mounted on said support surface and including a ring member, means for mounting said ring member on said support surface in substantially parallel relation thereto for rotation about an upstanding axis through the center of said ring member, said ring member having an external periphery and at least three mold boxes rigidly attached to said ring member at equiangular space intervals about the external periphery thereof, each said mold box including a bottomless frame member with open top and bottom ends and side walls defining a mold enclosing area;

an indexing controls mechanism for rotating said ring member about said upstanding axis in intermittent steps of arcuate movement wherein said mold boxes are sequentially moved in intermittent steps along an arcuate path to a soil receiving fill station, a soil compacting station, and a brick ejection station;

a slide plate mounted on said support surface and extending from said soil receiving station to said compacting station along the arcuate path traveled by said mold boxes, said slide plate being supported in abutting engagement with said frame members of the mold boxes to provide a bottom for the mold boxes at said soil receiving station and said compacting station and when moving between said soil receiving station and said compacting station;

conveyor means mounted on said support surface and controlled by said indexing controls mechanism to convey and deposit a mixture of soil and chemical additives in a predetermined proportion to a mold box at the soil receiving station;

a first ram means located at said compacting station which is operable for compacting the soil and additives in the mold box located at said compacting station to form a brick;

a second ram means located at said ejection station which is operable for ejecting a brick from a mold box located at said ejection station;

a second brick making system identical to said first brick making system wherein the ring member of said second system is mounted on said floor surface in substantially co-planar relationship with the ring member of said first brick making system; and wherein the slide plate of said second brick making system is a co-planar continuous extension of the slide plate of said first brick making system and the soil compacting station of said second brick making system is coincident with the soil compacting station of said first brick making system.

5. A brick manufacturing apparatus, said apparatus comprising a floor support surface;

a ring member mounted on said floor support surface in a plane substantially parallel thereto, said ring member having an external periphery, at least three mold boxes removably attached to said ring member at spaced intervals about the external periphery thereof, each said mold box including a bottomless frame member which is open at a top end and having side walls defining a mold enclosing area;

indexing control means for rotating said ring member about its central axis in intermittent steps wherein said mold boxes are sequentially moved in intermittent steps along a circular path to a soil receiving station, a soil compacting station, and a brick ejection station, said stations being equiangularly spaced with respect to the axis of rotation of said ring member;

a first slide plate section mounted on said support surface in substantially parallel relation thereto and extending from said soil receiving station to said compacting station along the path traveled by said mold boxes, said slide plate section being supported in abutting engagement with the frame members of the mold boxes when at the fill station and compacting station to provide a bottom for the mold boxes at said fill and compacting stations and when in movement therebetween;

first conveyor means for delivering soil to a mixture of soil and chemical additives to a mold box at the soil receiving station;

a first ram means located at said compacting station for compacting the mixture of soil and additives in a mold box located at said compacting station to form a brick;

a second ram means located at said ejection station for ejecting a brick from a mold box located at said ejection station;

a second brick making system having a second ring member mounted on said floor support surface in substantially parallel relation thereto said second ring member having an external periphery and at least three mold boxes removably attached to said second ring member at spaced intervals about the external periphery thereof, each of said mold boxes of said second system including a box frame member having side walls defining a mold enclosing area and being open at its top and bottom ends;

said indexing control means including means for rotating said second ring member about its central axis in intermittent steps wherein said mold boxes of said second system are sequentially moved in intermittent steps along a second circular path to a second system soil receiving fill station, a second system compacting station, and a second system brick ejection station, said second system stations being equiangularly spaced with respect to the axis of rotation of said second ring member and said second system compacting station being coincident with the soil compacting station of said first system;

a second slide plate section mounted on said support surface and extending from said second soil receiving station and said second compacting station along the second circular path traveled by said second system mold boxes, said second slide plate section being supported in abutting engagement with said box frame members of the mold boxes of said second system to provide a bottom for the mold boxes of said second system when at said second soil receiving station and said second compacting station and when moving between the second receiving station and said second compacting station;

second conveyor means mounted on said floor support surface and controlled by said control means for conveying and depositing a mixture of soil and chemical additives in a predetermined proportion into a mold box at the second system soil receiving station, said first ram means being operable for compacting soil and additives in a mold box of said second system when located at said compacting station to thereby form a brick; and a second ejecting means located at said second ejection station for ejecting a brick from a mold box located at said second ejection station.

* * * * *